US012609110B2

(12) United States Patent
Medalion et al.

(10) Patent No.:  US 12,609,110 B2
(45) Date of Patent:  Apr. 21, 2026

(54) TECHNIQUES FOR UTTERANCE GROUPING AND FOR IMPROVED TRAINING OF MACHINE LEARNING MODELS USING GROUPED UTTERANCE DATA

(71) Applicant: GONG.io Ltd., Ramat Gan (IL)

(72) Inventors: Shlomi Medalion, Lod (IL); Yehoshua Dissen, Modiin (IL)

(73) Assignee: GONG.io Ltd., Ramat Gan (IL)

( * ) Notice: Subject to any disclaimer, the term of this patent is extended or adjusted under 35 U.S.C. 154(b) by 163 days.

(21) Appl. No.: 18/441,789

(22) Filed: Feb. 14, 2024

(65) Prior Publication Data

US 2025/0259621 A1  Aug. 14, 2025

(51) Int. Cl.
| | |
|---|---|
| *G10L 15/00* | (2013.01) |
| *G10L 15/02* | (2006.01) |
| *G10L 15/06* | (2013.01) |
| *G10L 15/08* | (2006.01) |

(52) U.S. Cl.
CPC ............ *G10L 15/063* (2013.01); *G10L 15/02* (2013.01); *G10L 15/08* (2013.01); *G10L 2015/0631* (2013.01); *G10L 2015/0635* (2013.01)

(58) Field of Classification Search
CPC ....... G10L 15/16; G10L 19/005; G10L 19/00; G10L 25/27; G10L 25/30; G10L 15/02; G10L 15/12; G10L 15/22; G10L 15/26; G10L 15/30; G10L 15/20; G10L 15/07; G10L 15/063; G10L 15/08; G10L 15/14;

G10L 15/1815; G10L 15/197; G10L 15/1822; G10L 15/183; G10L 15/193; G10L 15/19; G10L 2015/0631; G10L 2015/0635

See application file for complete search history.

(56) References Cited

U.S. PATENT DOCUMENTS

| | | | |
|---|---|---|---|
| 5,195,167 A | 3/1993 | Bahl et al. | |
| 6,208,964 B1 | 3/2001 | Sabourin | |
| 6,243,680 B1 | 6/2001 | Gupta et al. | |
| 8,515,736 B1 | 8/2013 | Duta | |
| 8,688,453 B1 | 4/2014 | Joshi et al. | |
| 9,064,491 B2 | 6/2015 | Rachevsky et al. | |
| 9,905,223 B2 | 2/2018 | Chotimongkol et al. | |
| 10,140,277 B2 | 11/2018 | Unsal et al. | |
| 11,086,591 B2 | 8/2021 | Cremer et al. | |
| 2020/0349921 A1* | 11/2020 | Jansen ................... G10L 25/51 |
| 2022/0343917 A1* | 10/2022 | Tang ....................... G10L 15/32 |

\* cited by examiner

*Primary Examiner* — Vu B Hang

(74) *Attorney, Agent, or Firm* — M&B IP Analysts, LLC

(57)  ABSTRACT

A system and method for training a machine learning model using sample labeling. A method includes embedding a first plurality of audio samples into a plurality of embeddings, wherein each embedding is a feature representation of a respective portion of the first plurality of audio samples; grouping the plurality of embeddings into a plurality of groups; selecting a second plurality of audio samples to be labeled based on the plurality of groups, wherein the second plurality of audio samples is selected based on a plurality of confidence scores for the plurality of groups and based on an embedding space coverage for each of the plurality of groups; and labeling the selected second plurality of audio samples by applying an automated speech recognition model to the second plurality of audio samples.

21 Claims, 5 Drawing Sheets

TECHNIQUES FOR UTTERANCE GROUPING AND FOR IMPROVED TRAINING OF MACHINE LEARNING MODELS USING GROUPED UTTERANCE DATA

TECHNICAL FIELD

The present disclosure relates generally to machine learning for automated speech recognition solutions, and more specifically, to labeling utterances for use in training machine learning models.

BACKGROUND

Labeling data for training machine learning models to be used in speech-to-text systems is a tedious and expensive process. Further, much of the labeling efforts during later stages of training involves labeling samples for which the model is already capable of generating accurate predictions. Some of the later stage labeling also focuses on irrelevant regions of data where the number of audio streams is particularly sparse, such that training the model over these samples fails to result in the overall improvement of the model. Thus, most of the later stage labeling does not actually improve the accuracy of the model.

In automated speech recognition (ASR), the challenge of providing appropriate labeled data in order to improve the model is difficult to overcome. In particular, representing an entire sequence as needed for active learning while ensuring that each discrete frame has its own appropriate label is not a trivial task. Solutions which aid in labeling data to be used for training ASR models would therefore be highly desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, nor is it intended to either identify key or critical elements of all embodiments or to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for training a machine learning model using sample labeling. The method comprises: embedding a first plurality of audio samples into a plurality of embeddings, wherein each embedding is a feature representation of a respective portion of the first plurality of audio samples; grouping the plurality of embeddings into a plurality of groups; selecting a second plurality of audio samples to be labeled based on the plurality of groups, wherein the second plurality of audio samples is selected based on a plurality of confidence scores for the plurality of groups and based on an embedding space coverage for each of the plurality of groups; and labeling the selected second plurality of audio samples by applying an automated speech recognition model to the second plurality of audio samples.

Certain embodiments disclosed herein also include a non-transitory computer readable medium having stored thereon causing a processing circuitry to execute a process, the process comprising: embedding a first plurality of audio samples into a plurality of embeddings, wherein each embedding is a feature representation of a respective portion of the first plurality of audio samples; grouping the plurality of embeddings into a plurality of groups; selecting a second plurality of audio samples to be labeled based on the plurality of groups, wherein the second plurality of audio samples is selected based on a plurality of confidence scores for the plurality of groups and based on an embedding space coverage for each of the plurality of groups; and labeling the selected second plurality of audio samples by applying an automated speech recognition model to the second plurality of audio samples.

Certain embodiments disclosed herein also include a system for training a machine learning model using sample labeling. The system comprises: a processing circuitry; and a memory, the memory containing instructions that, when executed by the processing circuitry, configure the system to: embed a first plurality of audio samples into a plurality of embeddings, wherein each embedding is a feature representation of a respective portion of the first plurality of audio samples; group the plurality of embeddings into a plurality of groups; select a second plurality of audio samples to be labeled based on the plurality of groups, wherein the second plurality of audio samples is selected based on a plurality of confidence scores for the plurality of groups and based on an embedding space coverage for each of the plurality of groups; and label the selected second plurality of audio samples by applying an automated speech recognition model to the second plurality of audio samples.

Certain embodiments disclosed herein include the method, non-transitory computer readable medium, or system noted above or below, wherein the second plurality of training audio samples is selected based further on a region in space of each of the first plurality of training audio samples.

Certain embodiments disclosed herein include the method, non-transitory computer readable medium, or system noted above or below, wherein the second plurality of training audio samples is selected based further on a density of the region in space of each of the first plurality of training audio samples.

Certain embodiments disclosed herein include the method, non-transitory computer readable medium, or system noted above or below, wherein the embedding and grouping are performed over a plurality of iterations, further including or being configured to perform the following steps: at each iteration of the plurality of iterations, updating at least one embedding model of the plurality of embedding models.

Certain embodiments disclosed herein include the method, non-transitory computer readable medium, or system noted above or below, wherein each of the at least one embedding model is a machine learning model configured to output embeddings, further including or being configured to perform the following steps: at each iteration of the plurality of iterations: selecting a subset of the plurality of groups; and training the at least one embedding model using the selected subset of groups.

Certain embodiments disclosed herein include the method, non-transitory computer readable medium, or system noted above or below, further including or being configured to perform the following steps: at each iteration of the plurality of iterations: determining a plurality of confidence scores; and determining an embedding space coverage, wherein the subset of the plurality of groups is selected based on the plurality of confidence scores and the embedding space coverage.

Certain embodiments disclosed herein include the method, non-transitory computer readable medium, or system noted above or below, further including or being configured to perform the following steps: at each iteration of the plurality of iterations: identifying at least one group with mixed labels, wherein the subset of the plurality of groups is selected based on the identified at least one group with mixed labels.

Certain embodiments disclosed herein include the method, non-transitory computer readable medium, or system noted above or below, wherein the plurality of embeddings includes a plurality of explicit embeddings and a plurality of implicit embeddings, wherein the plurality of explicit embeddings includes a plurality of embeddings created using a language identification model and a plurality of embeddings created using a speaker identification model, wherein the plurality of implicit embeddings includes a plurality of embeddings created using an automated speech recognition model.

Certain embodiments disclosed herein include the method, non-transitory computer readable medium, or system noted above or below, further including or being configured to perform the following steps: combining explicit embeddings of the plurality of explicit embeddings with implicit embeddings of the plurality of implicit embeddings into a plurality of combined embeddings, wherein the plurality of embeddings further includes the plurality of combined embeddings.

Certain embodiments disclosed herein include the method, non-transitory computer readable medium, or system noted above or below, wherein the machine learning model is a classifier, wherein the labeled plurality of audio samples have a plurality of labels indicating respective classifications of utterances.

Certain embodiments disclosed herein include the method, non-transitory computer readable medium, or system noted above or below, further including or being configured to perform the following steps: clustering the plurality of embeddings into a plurality of clusters, wherein the plurality of groups is the plurality of clusters.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
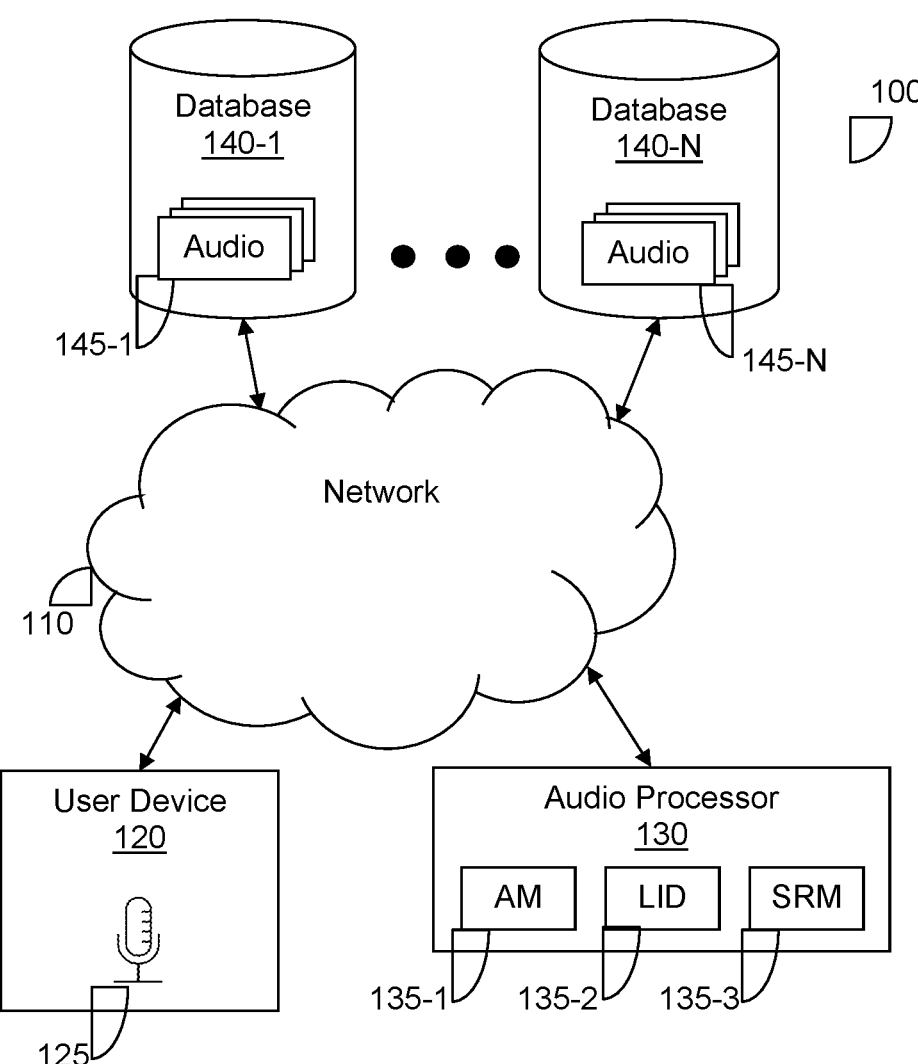
FIG. 1 is a network diagram utilized to describe various disclosed embodiments.

The various disclosed embodiments include methods and systems for labeling samples, for training machine learning models using labeled samples, and for performing automated speech recognition by applying machine learning models. The disclosed embodiments provide improved techniques for labeling audio samples which allows for training machine learning models more efficiently and to produce more accurate results than existing solutions. The various disclosed embodiments allow for providing a smaller quantity of higher value labeled training samples which can be utilized to train machine learning models to accurately recognize speech in line with the training samples while reducing the total amount of processing during training, for example, reducing an amount of processing at each iteration or reducing the number of iterations needed to train an accurate model, thereby reducing the total amount of processing of data during training.

In an embodiment, training audio samples are embedded and utilized for training machine learning models to perform aspects of audio processing. In a further embodiment, the embedded audio samples may be grouped, and the groups are utilized for training the machine learning models. The embedding and grouping may be performed iteratively, using results of one iteration to retrain the models used for embedding and applying those retrained models during subsequent iterations. The embedding and grouping results in a subset of groups whose respective samples are to be selected for labeling.

Samples from which labeled samples are to be created are selected with respect to factors such as, but not limited to, confidence for respective embeddings, embedding space coverage, both, and the like. The samples may include, but are not limited to, samples including utterances or other short fragments of speech (e.g., fragments containing at most a threshold number of words or syllables). The samples may be taken from audio of group meetings, phone calls, messages, and the like.

The selected samples are labeled. In some embodiments, the labeling may include applying one or more guided labeling processes such as, but not limited to, a process using active learning with weak supervision such as a labeling process iteratively performed in which labels are provided for a subset of samples at each iteration and the model proposes samples based on an exploration versus exploitation approach. The iterations may continue until, for example, one or more threshold criteria defined with respect to one or more model performance parameters are met. The labeled samples are utilized to train a machine learning model to make predictions with respect to the labeled samples, for example, by outputting labels for new samples corresponding to the respective labeled samples.

The disclosed embodiments provide techniques which allow for producing labeled training data in lower quantities while providing adequate exemplary data to train models to make accurate predictions. This lower amount of data requires fewer computing resources to store and to utilize for training, thereby conserving memory and processing power, while maintaining or improving the accuracy of the resulting models. In particular, various disclosed embodiments provide techniques which leverage low confidence utterances (e.g., based on confidence scores determined by the embedding models for the respective embeddings of samples within the group) and diversity among samples in order to filter out data, thereby reducing the amount of data used for effective training.

FIG. 1 shows an example network diagram 100 utilized to describe the various disclosed embodiments. In the example network diagram 100, a user device 120, an audio processor 130, and a plurality of databases 140-1 through 140-N

(hereinafter referred to individually as a database 140 and collectively as databases 140, merely for simplicity purposes) communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device (UD) 120 may be, but is not limited to, a personal computer, a laptop, a tablet computer, a smartphone, a wearable computing device, or any other device capable of receiving speech recognition outputs and utilizing those outputs for one or more user-facing functions. As non-limiting examples, the user device 120 may be configured to use speech recognition outputs for speech-to-text functions (e.g., for closed captioning or speech-to-text logging), for voice-activated commands (e.g., commands to a virtual agent or a self-driving vehicle), for voice-based authentication, combinations thereof, and the like.

The user device 120 may be further equipped with one or more input/output (I/O) devices and, in particular, audio-based I/O devices such as one or more microphones 125. The microphones 125 may be used to capture audio content containing speech (i.e., speech spoken by a user of the user device 120 or by others within capturing range of the microphones 125) in order to provide the audio processor 130 with audio content to be processed in accordance with the disclosed embodiments.

In an embodiment, the audio processor 130 is configured to process audio content (for example, audio content captured by the microphone 125 of the user device 120) using models trained in accordance with one or more of the disclosed techniques. To this end, the audio processor 130 may store any or all of an acoustic model (AM) 135-1, a language identification (LID) model 135-2, a speech recognition model (SRM) 135-3, other models (e.g., a speaker-identification model). In some embodiments, the audio processor 130 is configured to train at least the acoustic model 135-1, and may be further configured to train the LID 135-2, the speech recognition model 135-3, or both. In particular, in accordance with various disclosed embodiments, the audio processor 130 may be configured to train any or all of the models 135-1 through 135-3 using supervised machine learning based on training samples labeled using embedding and grouping as described herein, using unsupervised machine learning, or a combination of supervised and unsupervised techniques. As noted above, the disclosed techniques allow for providing high quality labeled samples in a lower volume, thereby allowing for more efficient training such models.

The training of the acoustic model 135-1 is performed using training audio content such as, but not limited to, audio content 145-1 through 145-N stored in respective databases 140-1 through 140-N. Such audio content 145 stored in the databases 140 includes audio content containing speech. In accordance with various disclosed embodiments, the audio content 145 is embedded, grouped, and labeled in order to produce labeled training samples (not depicted separately), and any or all of the models 135 are trained using such labeled training samples in a supervised training process. Alternatively or in combination, any or all of the models 135 may be trained using unlabeled samples in an unsupervised learning process.

It should be noted that the user device 120 and the audio processor 130 are depicted as separate entities for the sake of discussion, but that at least a portion of the functions performed by the audio processor 130 may be performed by the user device 120 and vice versa without departing from the scope of the disclosure. Moreover, the audio processor 130 is described as performing both the training and application of the models, but the disclosed embodiments are not so limited. Separate systems may be utilized for training the machine learning models and for processing audio using the trained models without departing from the scope of the disclosure.

Figure 2:
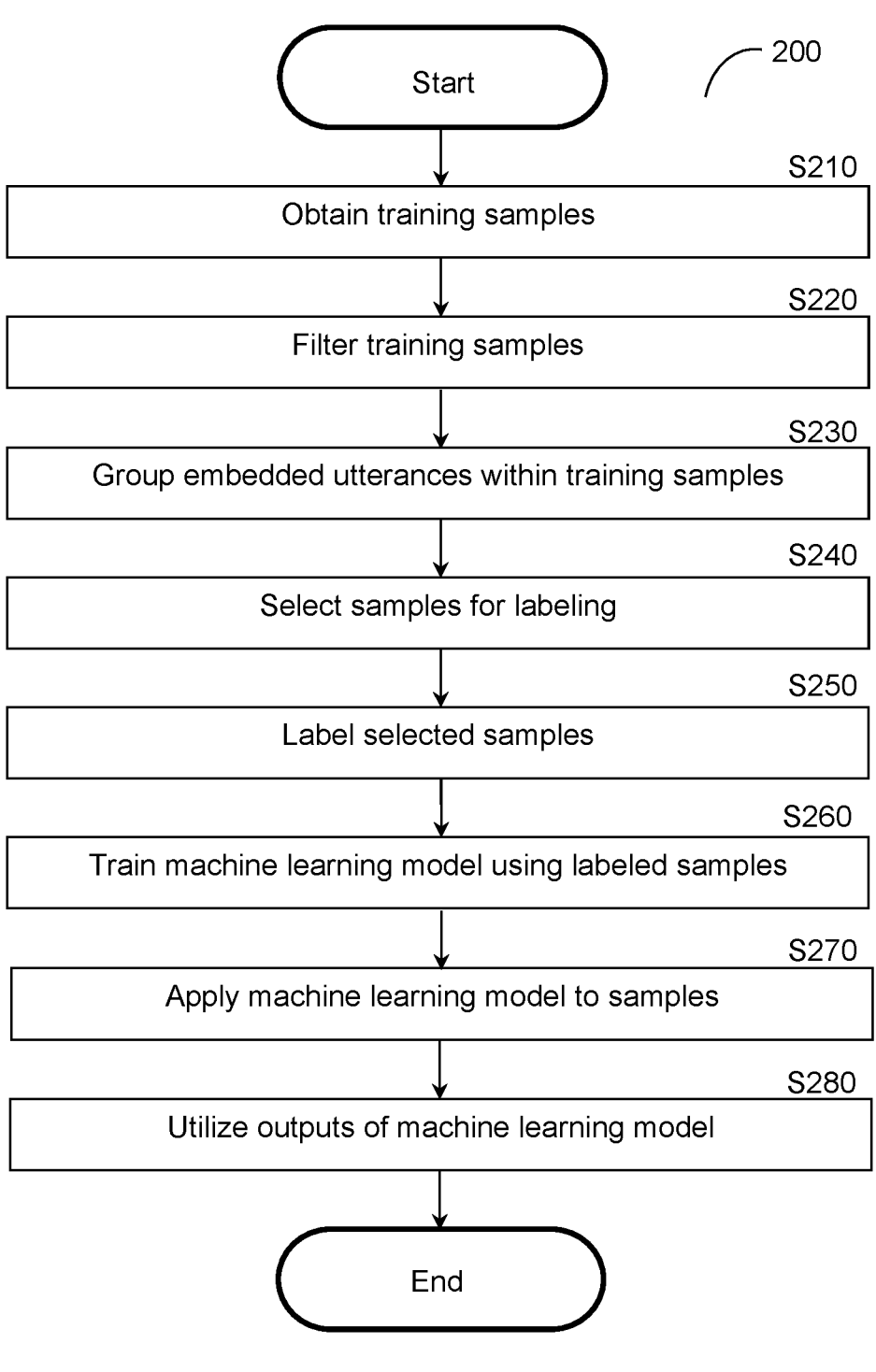
FIG. 2 is a flowchart illustrating a method for training machine learning models using labeled audio samples according to an embodiment.

FIG. 2 is a flowchart 200 illustrating a method for training machine learning models for automated speech recognition using labeled samples according to an embodiment. In an embodiment, the method is performed by the audio processor 130, FIG. 1.

At S210, training samples are obtained. The obtained training samples are audio samples. The samples may include, but are not limited to, samples including utterances or other short fragments of speech (e.g., fragments containing at most a threshold number of words or syllables). The samples may be taken from audio of group meetings, phone calls, messages, and the like.

At S220, the training samples are filtered. For example, irrelevant, uninteresting, or otherwise undesired samples may be filtered. To this end, S220 may include applying filtering rules defining criteria for filtering samples. The filtering rules may be based on predetermined utterances which are known to be uninteresting, and may indicate predetermined words, phrases, or other indicators of such known uninteresting utterances.

At S230, the training samples are embedded to create vector representations, and utterances within those vector representations are grouped. The grouping may be performed based on clustering of the embedded utterances, based on distances between the embedded utterances, both, and the like.

The embedding includes converting the samples into a feature representation. The feature representation may be a reduced representation (e.g., in a reduced feature space) as compared to the original samples. In an embodiment, the embedding is performed using one or more machine learning models trained to embed audio content. In a further embodiment, the embedding and grouping may be performed over a series of iterations, where any or all of the iterations include further training the embedding models such that any further trained models are utilized to perform embedding at the next iteration. In this manner, the models used for embedding can be iteratively improved, thereby resulting in more accurate embeddings and, consequently groups. In yet a further embodiment, each embedding model may further be configured to determine a confidence score for each embedding it generates. The confidence score indicates a likelihood that the vector representation created via the embedding is accurate and may be utilized, for example, to select samples including such groups for labeling to be used in training models as described further below.

In an embodiment, the grouping is performed as described below with respect to FIG. 3. Moreover, the grouping may be performed over multiple iterations. At each iteration, a new set of embeddings may be generated and then grouped. Results of one iteration may be utilized to train or otherwise update one or more embedding models performing the embedding for use during a subsequent iteration (e.g., the next iteration). The embedding and grouping may be performed iteratively until one or more termination criteria are met. As a non-limiting example, at each iteration, groups may be scored with respect to one or more indicators of suitability for labeling. When an iteration fails to yield groups which have higher scores than a previous iteration, the iterations may terminate. The results of the final iteration or otherwise the iteration having the highest scores may be utilized as the samples for subsequent processing (e.g., for selection and labeling per S240 and S250).

As further described below with respect to FIG. 4, in various embodiments, the embedding process at any given iteration produces one or more explicit embeddings and one or more implicit embeddings. To this end, different models may be used to create different embeddings, with some of the models (such as a language identification model or a speaker identification model) producing explicit embeddings and other models (such as an automated speech recognition model) producing implicit embeddings. Any or all of the embeddings created at a given iteration may be combined into a combined embedding for the iteration.

At S240, samples to be labeled are selected based on the embedded groups.

In an embodiment, the samples to be labeled are selected so as to eliminate samples which will reduce or otherwise fail to improve efficiency of model training. To this end, the samples are selected based on factors including confidence, diversity, or both. More specifically, the samples may be selected so as to select samples having groups which demonstrate low confidence and embedding space diversity as discussed further below. Moreover, in at least some embodiments, more samples may be selected from denser regions than from less dense regions in space (e.g., more samples may be taken from regions having a density above a threshold than samples taken from regions having a density below a threshold). Using more samples from denser regions in space allows for improving performance of any models trained using the samples as discussed herein.

In an embodiment, the samples to be labeled are selected based on the subsets of groups determined during an iteration of embedding and grouping as discussed below with respect to FIG. 3. More specifically, such groups may include a subset of groups determined at the most recent iteration of embedding and grouping prior to a final iteration, e.g., the last iteration which yielded higher average suitability scores than a previous iteration as discussed below with respect to FIG. 3. In such an embodiment, samples including utterances among the subset of groups determined at the applicable iteration may be selected for labeling.

Specifically, as discussed further below, the group selection criteria used to determine subsets of groups for subsequent processing may define criteria for selecting groups including low confidence samples or portions thereof (e.g., based on confidence scores determined by the embedding models for the respective embeddings of samples within the group). To this end, the low confidence groups may be groups having confidence scores below a threshold, and subsets of groups may be determined with respect to confidence based on a number or proportion of samples within the group which are low confidence, or may be selected based on an average confidence score among samples within the group (i.e., such that a group whose samples have an average confidence score below a threshold is eligible for selection with respect to confidence).

Also, the group selection criteria may define criteria for selecting groups so as to optimize sample diversity, for example with respect to groups including underrepresented utterances (e.g., utterances whose embeddings demonstrate features that fall outside average or otherwise normal distributions as compared to utterances of previously labeled samples). To this end, the underrepresented utterances may be determined at least partially based on feature density as compared to utterances of such previously labeled samples.

In this regard, it has been identified that the optimal samples for training in order to avoid counterproductive training which is either redundant or counterproductive for model training may be selected by identifying groups of utterances among potential training samples which exhibit low confidence and diversity as discussed above. That is, by selecting only samples including groups which exhibit such properties or by selecting samples with a preference toward groups which exhibit such properties (i.e., selecting more samples that exhibit these properties than samples which do not exhibit these properties), the total amount of training data may be reduced while producing models which demonstrate comparable or better accuracy than models trained without such group selection. Moreover, because the total number of samples used for training is reduced compared to all of the potential training data, the processing required to train machine learning models using such selected samples is reduced, and the training may be completed more quickly at any given iteration, thereby conserving computing resources. As noted above, in some embodiments, more of the samples are selected from denser regions in space in order to improve performance in this manner.

At S250, the selected samples are labeled. The labels include titles for the samples. The labeling may be performed, for example, using an automatic speech recognition (ASR) model, via manual labeling, a combination thereof, and the like. The labels for each sample may include, but are not limited to, labels for any of the groups within the sample. In an embodiment, S250 further includes determining labels for each group within each sample, and labeling the samples based on the labels for the groups within each sample.

At S250, the outputs determined at S250 are utilized or sent for use. In an example implementation, the application samples may be labeled using their respective predicted classifications.

Figure 3:
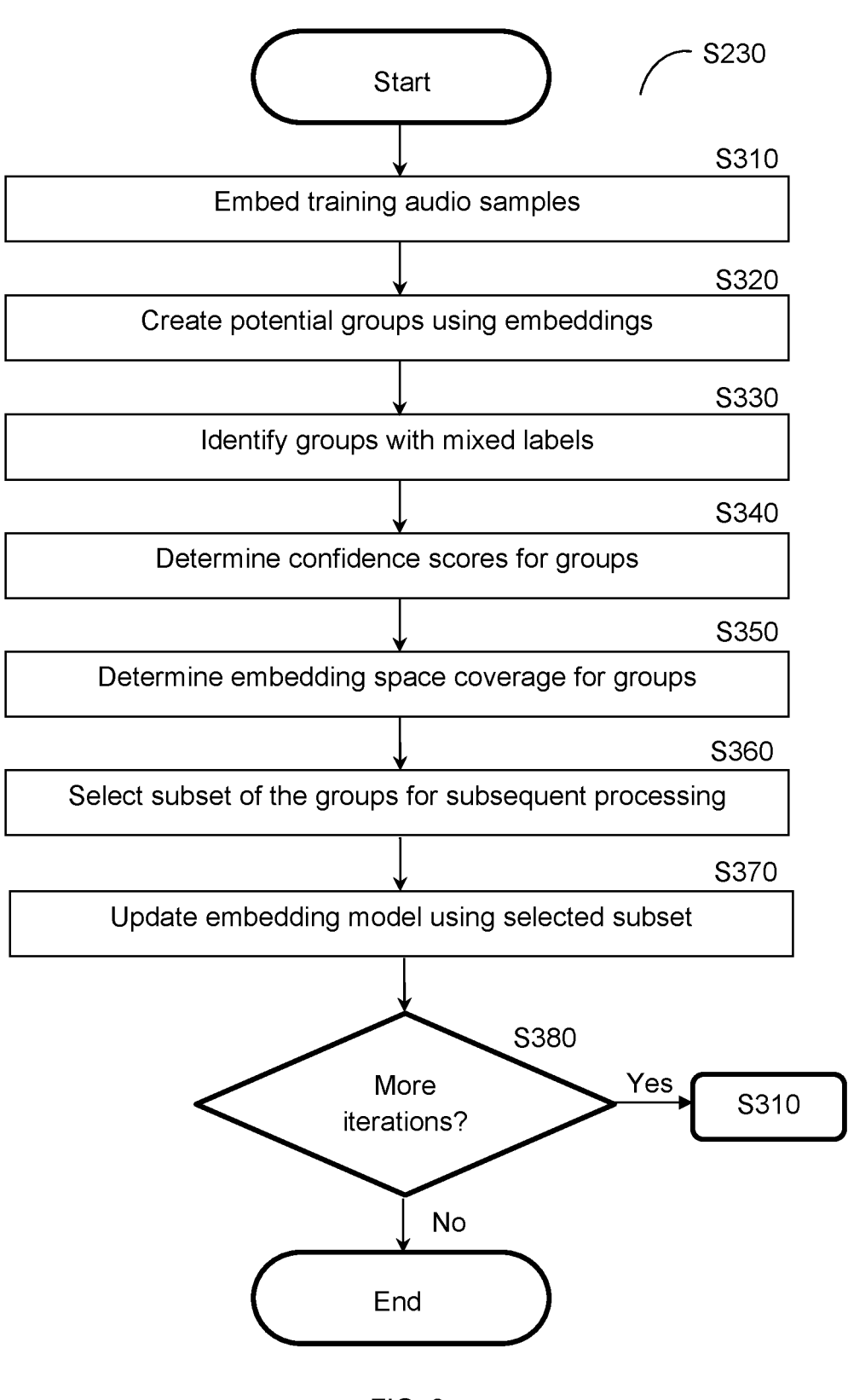
FIG. 3 is a flowchart illustrating a method for grouping embedded utterances according to an embodiment.

FIG. 3 is a flowchart S230 illustrating a method for grouping embedded utterances according to an embodiment.

At S310, training audio samples are embedded into embeddings. Each embedding is a feature representation of at least a portion of one of the training audio samples and may be, but is not limited to, a vector, matrix, or other mathematical structure quantifying certain characteristics of the training audio sample.

In an embodiment, the embeddings for each training audio sample include one or more explicit embeddings and one or more implicit embeddings. The explicit embeddings include representations of certain aspects of the These aspects may include hidden features such as, but not limited to, an embedding representation of audio created via a diarization model. These aspects may further include representations of implicit features from the training samples such as, but not limited to, features obtained from an embedding layer (e.g., an embedding layer of an ASR model). Such features may include, but are not limited to, vectors representing respective audio segments. In some embodiments, the embeddings may be combined. An example process for creating embeddings is described further below with respect to FIG. 4.

At S320, potential groups are created using the embeddings. The potential groups may be initially created, for example, based on one or more grouping schemes. Such grouping schemes may be realized, for example, via clustering of the embedded utterances, based on distances between the embedded utterances, and the like. The potential groups are analyzed during the following steps in order to determine whether they should be output and utilized for subsequent processing.

At S330, groups with mixed labels are identified from among the potential groups. More specifically, based on samples among the grouped training data which have labels, it can be determined whether each group includes a mix of labels. In an embodiment, such mixed label determination can be performed at phoneme-level, for example, groups including audio content corresponding to different phoneme labels.

In some embodiments, S330 may further include correcting false labels among the labeled portions of the training data. To this end, groups with mixed labels identified at S330 may be presented to a user for observation and potential relabeling. The user may indicate whether the label was correct and may propose a new label. Once any such relabeling is performed, groups including relabeled data may be reanalyzed to determine whether they still include mixed labels.

At S340, confidence scores for the potential groups are determined. The identified confidence scores may be, but are not limited to, confidence scores for samples within each group, an average or other aggregate confidence score determined based on confidence scores of samples within each group, and the like. As noted above, an embedding model which embeds samples as described herein may output confidence scores for the embeddings they respectively generate. These embedding confidence scores may be identified and determined as confidence scores for their respective groups, or an aggregate confidence score (e.g., an average of the scores of the individual samples of the group) may be determined for each group.

At S350, an embedding space coverage is determined for each of the potential groups. Specifically, the embedding space coverage is determined with respect to previously labeled data. The goal is to maximize exploration of unvisited or otherwise underrepresented regions in the potential embedding space in order to optimize training by ensuring that the maximum amount of embedding space coverage is realized using the groups selected for subsequent processing while limiting the number of groups which must be subsequently processed.

At S360, a subset of the groups is selected for subsequent processing (e.g., for use in updating the embedding model or for proposing candidate groups for potential labeling). The subset of the groups is selected using one or more group selection criteria defined with respect to one or more of the determinations made in S330 through S350.

In an embodiment, the group selection criteria at least require that groups selected for subsequent processing be low confidence (e.g., having an aggregate confidence score below a threshold) and demonstrate high embedding space coverage as compared to previously trained samples (e.g., covers at least a threshold amount or proportion of the potential embedding space which was not covered by previously trained samples). In a further embodiment, the group selection criteria may further require that only groups with mixed labels as identified at S330 be selected for subsequent processing.

In a further embodiment, the group selection criteria may be based on suitability scores. Specifically, groups may be scored with respect to suitability for labeling based on factors such as confidence and embedding space coverage. The selected groups may therefore be groups having respective suitability scores above a threshold. To this end, in such an embodiment, S330 may include generating such suitability scores. As a non-limiting example, a suitability score may be a weighted score determined using scores representing a degree of confidence (or lack thereof, i.e., uncertainty)

and embedding space coverage, respectively, by applying weights to those respective scores and summing the results.

At S370, a model used for creating the embeddings is updated using the selected subset. When the embedding model is a machine learning model, S370 may include training the embedding model using the selected subset. At subsequent iterations, the updated embedding model is utilized to generate new embeddings.

At S380, it is determined whether additional iterations of embedding and grouping are to be performed and, if so, execution continues with S310; otherwise, execution terminates. In an embodiment, S380 may include checking whether one or more termination criteria are met. As a non-limiting example, S380 may include scoring groups with respect to one or more indicators of suitability for labeling. When the group scores are not higher than group scores of a previous iteration (e.g., based on an average, median, or other measurement representing multiple scores), it may be determined that additional iterations are not needed, and execution may terminate.

Figure 4:
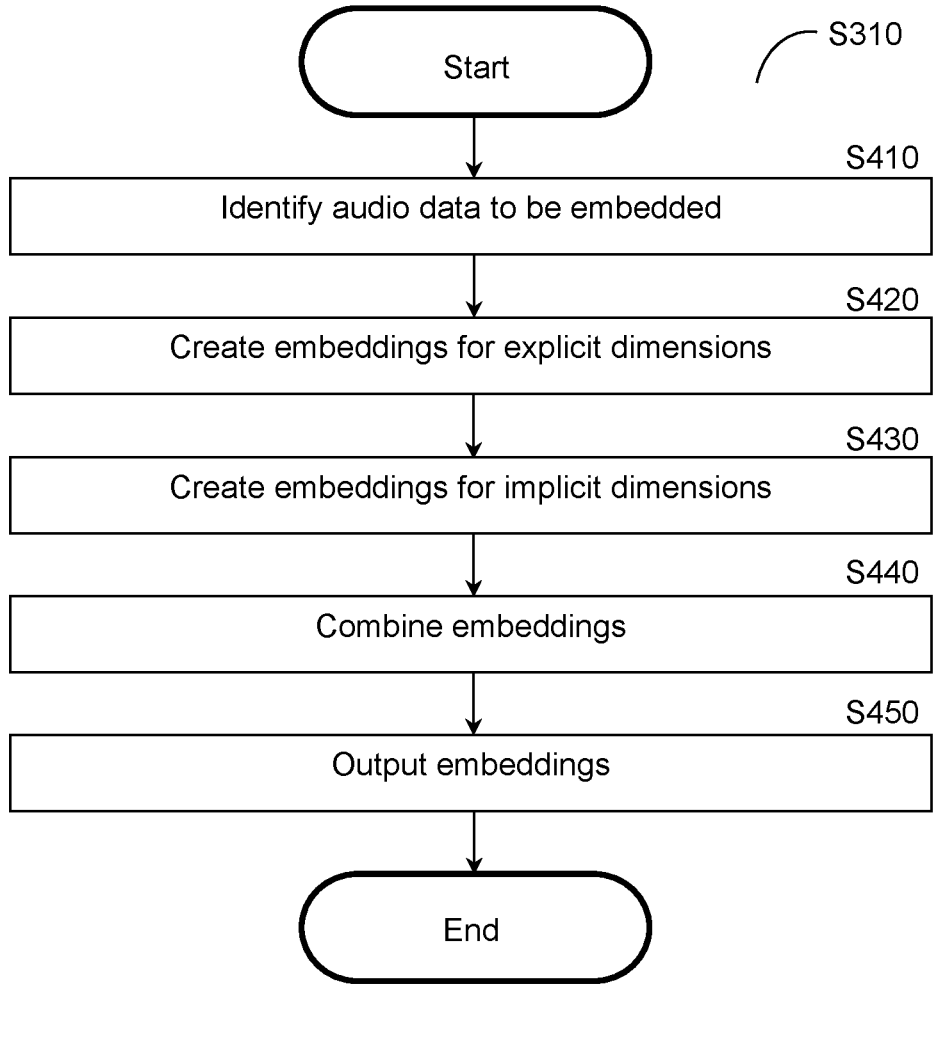
FIG. 4 is a flowchart illustrating a method for embedding utterances according to an embodiment.

FIG. 4 is a flowchart S310 illustrating a method for embedding utterances according to an embodiment.

At S410, audio data to be embedded is identified. The audio data to be embedded may include, but is not limited to, a set of training samples or a subset thereof (e.g., a subset including a selected subset of groups, for example groups selected during a previous iteration of embedding as discussed above with respect to S360).

At S420, one or more explicit embeddings are created for explicit dimensions. The explicit dimensions may include, but are not limited to, an embedding representation of audio created via a diarization model. Alternatively or in combination, the explicit dimensions may further represent features such as, but not limited to, speaker discretization, accent, and the like. The explicit embeddings may include or be based on outputs of language identification (LID), speaker identification, both, and the like. To this end, S420 may include applying a language identification (LID) model, a speaker identification (SID) model, both, or other models configured to determine such implicit embeddings. Each such model may be a machine learning model.

Each utterance or phrase within the sample may be represented by one or more utterance-level explicit embeddings. In an embodiment, such utterance-level explicit embeddings include a LID embedding and a SID embedding.

At S430, one or more implicit embeddings are created for implicit dimensions. These aspects may further implicit embeddings include representations of implicit features from the training samples such as, but not limited to, features obtained from an embedding layer (e.g., an embedding layer of an ASR model). Such features may include, but are not limited to, vectors representing respective audio segments. Alternatively or in combination, the implicit dimensions may represent features such as, but not limited to, uncertainty for specific utterances predicted using automated speech recognition (ASR). To this end, S430 may include applying an ASR model or another model configured to determine such implicit dimensions.

Each frame of audio content within each sample may have one or more respective implicit embeddings (i.e., the implicit embeddings may be frame-level embeddings). Each frame may be represented, for example, as an implicit embedding vector including ASR values. Moreover, each utterance or phrase within the sample includes multiple frames and, consequently, has multiple corresponding embeddings (i.e., the embeddings of the frames which make up the utterance or phrase). Consequently, each utterance or phrase within the sample may be further represented by multiple implicit embeddings in addition to the explicit embeddings used to represent the utterance or phrase.

At optional S440, two or more of the embeddings are combined in order to create one or more combined embeddings. In an embodiment, at least some of the explicit embeddings are combined with at least some of the implicit embeddings. More specifically, explicit and implicit embeddings for each utterance or phrase may be combined into a combined embedding, thereby resulting in a combined embedding for each utterance or phrase in the sample. In some alternative implementations, different samples may be found using different representations, and those samples may be aggregated into an aggregated embedding to serve as a combined embedding.

Specifically, in an embodiment, values representing explicit and implicit indicators may be combined from different embeddings and incorporated into a combined embedding. As a non-limiting example, when an explicit embedding for a sample and an implicit embedding for a sample are both vectors, the result of combining those embeddings may be a vector or other array including both the explicit embedding values and the implicit embedding values. In a further embodiment, the combined embedding may include values indicating results of ASR, LID, and SID, such that the combined embedding represents all of these aspects of the audio content. In another embodiment, a hierarchical combining method may be utilized to combine the embeddings.

At S450, the resulting embeddings (e.g., the embeddings created at S420, S430, S440, or a combination thereof), are output for subsequent use. As noted above, the embeddings may be utilized for grouping samples, for selecting subsets of groups, or both. Further, any confidence scores associated with respective embeddings may also be output at S450.

Figure 5:
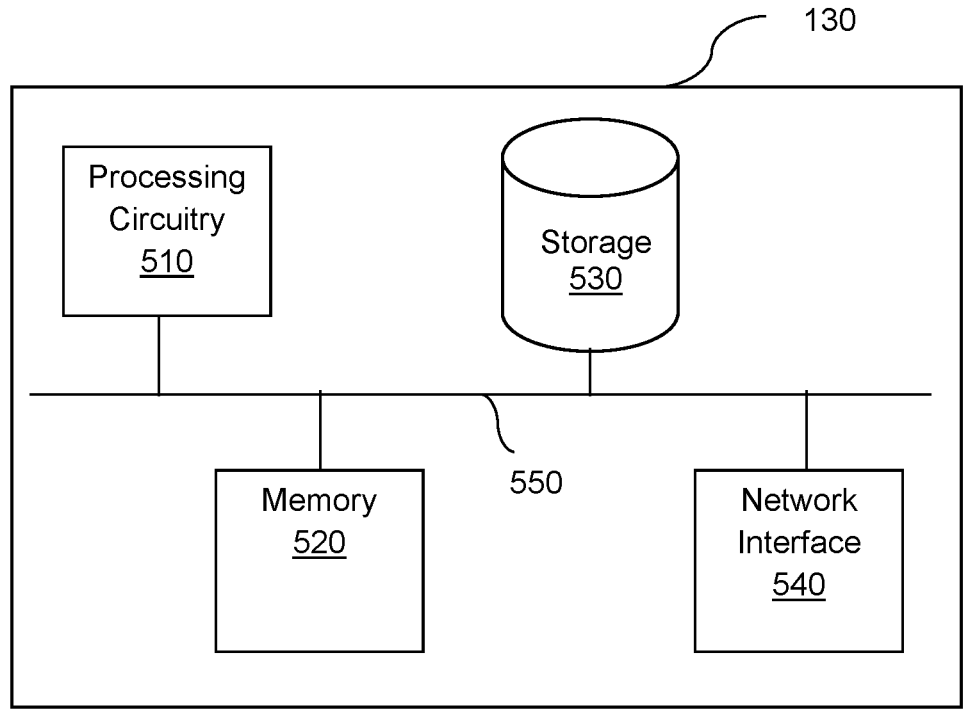
FIG. 5 is a schematic diagram of an audio processor according to an embodiment.

FIG. 5 is an example schematic diagram of an audio processor 130 according to an embodiment. The audio processor 130 includes a processing circuitry 510 coupled to a memory 520, a storage 530, and a network interface 540. In an embodiment, the components of the audio processor 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the audio processor 130 to communicate with, for example, the user device 120, the databases 140, both, and the like.

It should be understood that the embodiments described herein are not limited to the specific architecture illustrated in FIG. 5, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for training a machine learning model using sample labeling, comprising:

embedding a first plurality of audio samples into a plurality of embeddings, wherein each embedding is a feature representation of a respective portion of the first plurality of audio samples;

grouping the plurality of embeddings into a plurality of groups, wherein the first plurality of audio samples is embedded using a plurality of embedding models, wherein the embedding and grouping are performed over a plurality of iterations, further comprising:

at each iteration of the plurality of iterations, updating at least one embedding model of the plurality of embedding models;

selecting a second plurality of audio samples to be labeled based on the plurality of groups, wherein the second plurality of audio samples is selected based on a plurality of confidence scores for the plurality of groups and based on an embedding space coverage for each of the plurality of groups; and labeling the selected second plurality of audio samples by applying an automated speech recognition model to the second plurality of audio samples.

2. The method of claim 1, wherein the second plurality of training audio samples is selected based further on a region in space of each of the first plurality of training audio samples.

3. The method of claim 2, wherein the second plurality of training audio samples is selected based further on a density of the region in space of each of the first plurality of training audio samples.

4. The method of claim 1, wherein each of the at least one embedding model is a machine learning model configured to output embeddings, wherein updating the at least one embedding model of the plurality of embedding models further comprises:

at each iteration of the plurality of iterations:

selecting a subset of the plurality of groups; and training the at least one embedding model using the selected subset of groups.

5. The method of claim 4, wherein updating the at least one embedding model of the plurality of embedding models further comprises:

at each iteration of the plurality of iterations:

determining a plurality of confidence scores; and determining an embedding space coverage, wherein the subset of the plurality of groups is selected based on the plurality of confidence scores and the embedding space coverage.

6. The method of claim 4, wherein updating the at least one embedding model of the plurality of embedding models further comprises:

at each iteration of the plurality of iterations:

identifying at least one group with mixed labels, wherein the subset of the plurality of groups is selected based on the identified at least one group with mixed labels.

7. The method of claim 1, wherein the plurality of embeddings includes a plurality of explicit embeddings and a plurality of implicit embeddings, wherein the plurality of explicit embeddings includes a plurality of embeddings created using a language identification model and a plurality of embeddings created using a speaker identification model, wherein the plurality of implicit embeddings includes a plurality of embeddings created using an automated speech recognition model.

8. The method of claim 7, further comprising:

combining explicit embeddings of the plurality of explicit embeddings with implicit embeddings of the plurality of implicit embeddings into a plurality of combined embeddings, wherein the plurality of embeddings further includes the plurality of combined embeddings.

9. The method of claim 1, wherein the machine learning model is a classifier, wherein the labeled plurality of audio samples have a plurality of labels indicating respective classifications of utterances.

10. The method of claim 1, wherein grouping the plurality of embeddings further comprises:

clustering the plurality of embeddings into a plurality of clusters, wherein the plurality of groups is the plurality of clusters.

11. A non-transitory computer readable medium having stored thereon instructions for causing a processing circuitry to execute a process, the process comprising:

embedding a first plurality of audio samples into a plurality of embeddings, wherein each embedding is a feature representation of a respective portion of the first plurality of audio samples;

grouping the plurality of embeddings into a plurality of groups, wherein the first plurality of audio samples is embedded using a plurality of embedding models, wherein the embedding and grouping are performed over a plurality of iterations, further comprising:

at each iteration of the plurality of iterations, updating at least one embedding model of the plurality of embedding models;

selecting a second plurality of audio samples to be labeled based on the plurality of groups, wherein the second plurality of audio samples is selected based on a plurality of confidence scores for the plurality of groups and based on an embedding space coverage for each of the plurality of groups; and labeling the selected second plurality of audio samples by applying an automated speech recognition model to the second plurality of audio samples.

12. A system for training a machine learning model using sample labeling, comprising:

a processing circuitry; and a memory, the memory containing instructions that, when executed by the processing circuitry, configure the system to:

embed a first plurality of audio samples into a plurality of embeddings, wherein each embedding is a feature representation of a respective portion of the first plurality of audio samples;

group the plurality of embeddings into a plurality of groups, wherein the first plurality of audio samples is embedded using a plurality of embedding models, wherein embedding and grouping are performed over a plurality of iterations, wherein the system is further configured to:

at each iteration of the plurality of iterations, update at least one embedding model of the plurality of embedding models;

select a second plurality of audio samples to be labeled based on the plurality of groups, wherein the second plurality of audio samples is selected based on a plurality of confidence scores for the plurality of groups and based on an embedding space coverage for each of the plurality of groups; and label the selected second plurality of audio samples by applying an automated speech recognition model to the second plurality of audio samples.

13. The system of claim 12, wherein the second plurality of training audio samples is selected based further on a region in space of each of the first plurality of training audio samples.

14. The system of claim 13, wherein the second plurality of training audio samples is selected based further on a density of the region in space of each of the first plurality of training audio samples.

15. The system of claim 13, wherein each of the at least one embedding model is a machine learning model configured to output embeddings, wherein the system is further configured to:

at each iteration of the plurality of iterations:
select a subset of the plurality of groups; and
train the at least one embedding model using the selected subset of groups.

16. The system of claim 15, wherein the system is further configured to:

at each iteration of the plurality of iterations:

determine a plurality of confidence scores; and determine an embedding space coverage, wherein the subset of the plurality of groups is selected based on the plurality of confidence scores and the embedding space coverage.

17. The system of claim 15, wherein the system is further configured to:

at each iteration of the plurality of iterations:
identify at least one group with mixed labels, wherein the subset of the plurality of groups is selected based on the identified at least one group with mixed labels.

18. The system of claim 12, wherein the plurality of embeddings includes a plurality of explicit embeddings and a plurality of implicit embeddings, wherein the plurality of explicit embeddings includes a plurality of embeddings created using a language identification model and a plurality of embeddings created using a speaker identification model, wherein the plurality of implicit embeddings includes a plurality of embeddings created using an automated speech recognition model.

19. The system of claim 18, wherein the system is further configured to:

combine explicit embeddings of the plurality of explicit embeddings with implicit embeddings of the plurality of implicit embeddings into a plurality of combined embeddings, wherein the plurality of embeddings further includes the plurality of combined embeddings.

20. The system of claim 12, wherein the machine learning model is a classifier, wherein the labeled plurality of audio samples have a plurality of labels indicating respective classifications of utterances.

21. The system of claim 12, wherein the system is further configured to:

cluster the plurality of embeddings into a plurality of clusters, wherein the plurality of groups is the plurality of clusters.

* * * * *